United States Patent [19]
Berry

[11] Patent Number: 5,255,618
[45] Date of Patent: Oct. 26, 1993

[54] SEEDER APPARATUS

[75] Inventor: Steven S. Berry, Elizabeth City, N.C.

[73] Assignee: Steve Berry Enterprises, Inc., Elizabeth City, N.C.

[21] Appl. No.: 818,087

[22] Filed: Jan. 8, 1992

[51] Int. Cl.$^5$ .............................................. B65B 1/08
[52] U.S. Cl. .................... 111/200; 111/900; 414/404; 221/211; 53/247; 53/539
[58] Field of Search .............. 111/200, 900, 915, 916, 97/901; 221/278, 211; 914/404, 417; 53/539, 247

[56] References Cited

U.S. PATENT DOCUMENTS

| | | | |
|---|---|---|---|
| 1,622,493 | 3/1927 | Craig | 53/247 |
| 2,143,518 | 1/1939 | Kolin | 53/539 |
| 2,546,838 | 3/1951 | Tasche | 111/1 |
| 3,627,173 | 12/1971 | Kerker | 221/211 |
| 3,738,530 | 6/1973 | Fine et al. | 111/200 |
| 3,750,832 | 8/1973 | Ovarnstrom | 221/211 |
| 3,986,638 | 10/1976 | DeHart | 111/200 |
| 4,026,091 | 5/1977 | Pearson | 53/390 |
| 4,109,824 | 8/1978 | Davis | 111/200 |
| 4,251,011 | 2/1981 | Hamilton et al. | 221/211 |
| 4,573,609 | 3/1986 | Tesch | 221/211 |
| 4,627,190 | 12/1986 | Little | 222/211 |
| 4,928,324 | 5/1990 | Evans et al. | 2/424 |

FOREIGN PATENT DOCUMENTS

804368 2/1981 U.S.S.R. .
2048035 12/1980 United Kingdom .

OTHER PUBLICATIONS

Super Seeder Advertisement, undated, 7 pages.
Growing System, Inc. Advertisement, Jun. 1, 1984, 9 pages.

*Primary Examiner*—Dennis L. Taylor
*Assistant Examiner*—Spencer Warnick
*Attorney, Agent, or Firm*—Griffin, Butler, Whisenhunt & Kurtossy

[57] ABSTRACT

A seeder apparatus comprises a seeder plate (18), which is hingedly attached at a hinge edge (70) thereof to a frame (16), with the frame being mounted on a plug-tray conveyor (12). The seeder plate includes a substantially-flat seeder sheet (36) having seed holes (38) therein and a pressure-plenum (48) on a backside (41) of the seeder plate for producing negative and positive pressures at the seed holes. Hinges (20) are double-acting, spring-loaded barroom type door hinges which bias the seeder plate toward an upright intermediate position which is approximately halfway through 180° movement of the seeder plate between an approximately horizontal loading position and an approximately horizontal planting position. The seeder plate includes a vibrator (54) for automatically vibrating it and an angular-activation adjustment element (60) for adjusting the angular positions in which this vibration takes place. The conveyor is controlled by rotational movement of the seeder plate, with movement of plug trays (24) being caused by moving the seeder plate into the planting position after a delay.

17 Claims, 2 Drawing Sheets

SEEDER APPARATUS

BACKGROUND OF THE INVENTION

This application pertains to seeders and more particularly seeders which employ pressure activated plates, or trays.

It is well known in the prior art to apply a negative pressure to a backside of a seed sheet, or plate, to hold seeds to a front side of the sheet at holes therethrough and to then move the sheet to a planting position where the negative pressure is replaced by a positive pressure to release the seeds and deposit them in plugs in a plug tray. U.S. Pat. No. 3,627,173 to Kerker, for example, discloses a rather complicated automated, pressure-activated, seed-dispensing machine with which a pick-up element is moved from a first position to a second position for depositing seeds.

U.S. Pat. No. 4,573,609 to Tesch, on the other hand, discloses such a seed-planting apparatus which is primarily operated by hand. A difficulty with this device is that it is cumbersome, time-consuming and labor-intensive to use.

It is an object of this invention to provide a seeder apparatus which is relatively uncomplicated in structure and operation, and therefore is relatively inexpensive, but yet which can be operated at relatively great speeds with small expenditures of time and effort. In this regard, it is an object of this invention to provide such a seeder which can, to a large part, be operated by hand, but which requires a relatively small amount of physical effort on the part of an operator.

Further, it is an object of this invention to provide a seeder which, even though it can be operated at relatively great speeds, is highly accurate in operation allowing very small numbers of double plantings and/or failed plantings.

SUMMARY OF THE INVENTION

According to principles of this invention, a seeder includes a pressurized seeder plate which is hingedly attached to a frame at a hinge edge thereof so that it can be rotated through approximately 180°, relative to the frame, between a loading position, in which the seeder sheet is approximately horizontal with a backside thereof facing downwards, and a planting position, in which the seeder sheet is approximately horizontal with a front side of the seeder sheet facing downwards. A hinge apparatus is spring-loaded so that the seeder plate is normally biased toward a neutral position approximately halfway between the loading position and the planting position in which it is approximately vertical so that an operator need not expend a great deal of effort to move the seeder plate between the loading position and the planting position. A vibrating device is mounted on the seeder plate for vibrating the plate when it is moved between the loading position and the planting position, and it includes an angular-activation adjustment element for activating the vibrating device at a particular angle interval of the seeder plate. The frame is mounted on a plug-tray conveyor with the level and height thereof being adjustable relative to the conveyor. The plug-tray conveyor is actuated to replace a plug tray from the planting position and bring a new plug tray adjacent the planting position after a delay when the seeder plate is moved to the planting position.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the drawings. The drawings are not necessarily to scale, emphasis instead being placed upon illustrating principles of the invention in a clear manner.

DESCRIPTION OF A PREFERRED EMBODIMENT

Figure 1:
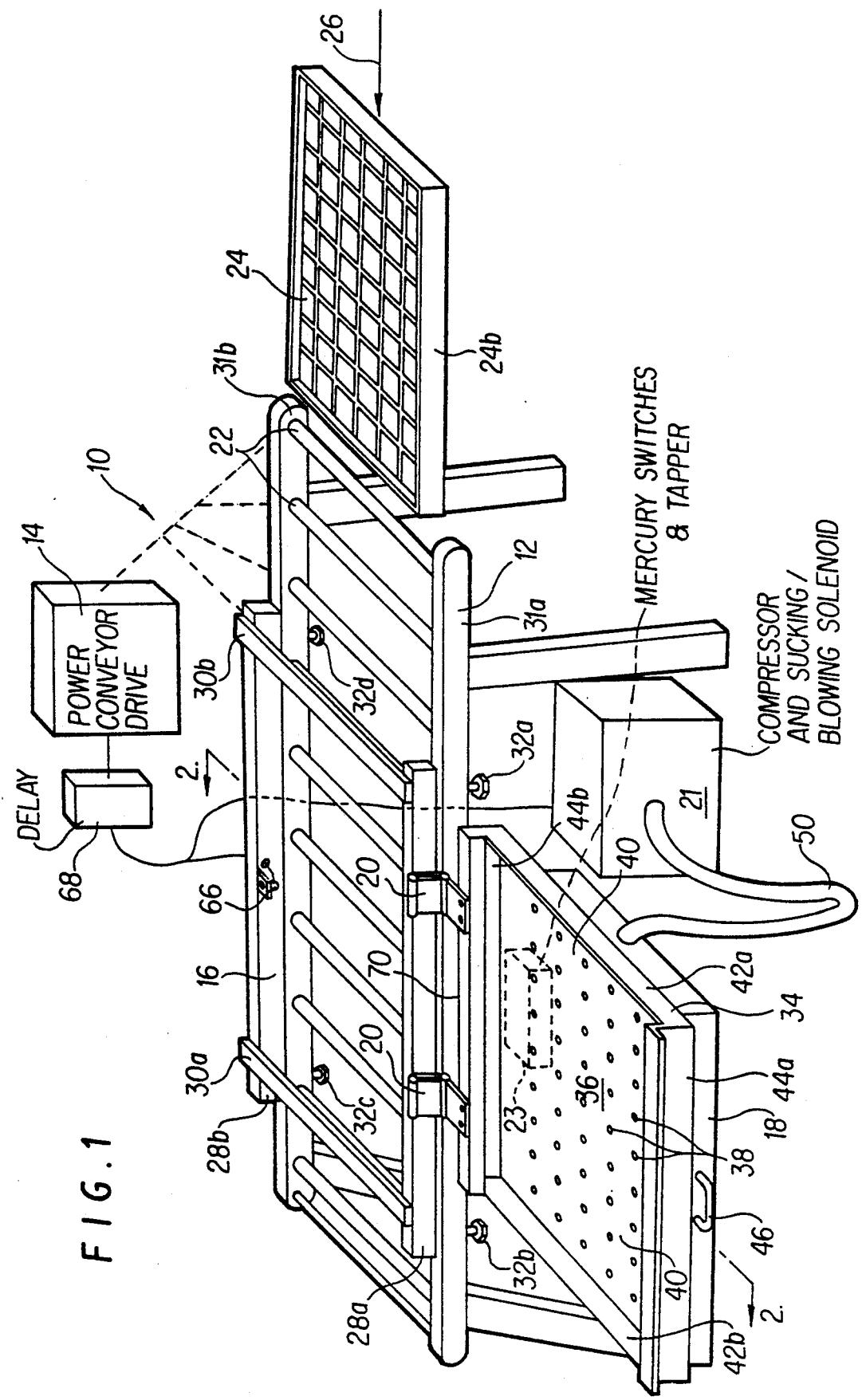
FIG. 1 is an isometric, partially-schematic, partially-block, view of a seeder apparatus of this invention with a seeder plate thereof being in a loading position and a plug tray therefor being exploded therefrom.

A seeder apparatus 10 comprises basically a plug-tray conveyor 12 having a power conveyor-drive 14, a frame 16, a seeder plate 18, hinges 20 for attaching a hinge edge of the seeder plate 18 to the frame 16, a compressor 21 with associated control elements, and a vibration apparatus 23 with associated control elements.

The plug-tray conveyor 12 comprises rollers 22 which are rotated by the power conveyor-drive 14, whose linkage is shown schematically by dashed lines in FIG. 1. In this regard, in one embodiment a motor of the power conveyor-drive drives a belt which is coupled to the rollers 22 for rotating them to move plug trays 24 in a direction indicated by an arrow 26. It is not thought necessary to describe the support and structure of the plug-tray conveyor 12 in great detail inasmuch as this apparatus can have various forms.

The frame 16 comprises two longitudinal members 28a and b and two cross members 30a and b which interconnect the longitudinal members 28a and b. The longitudinal members 28a and b are mounted on longitudinal supports 31a and b of the plug-tray conveyor 12 by means of leveling/height-adjusting bolts 32a, b, c, and d. That is, by rotating the leveling/height-adjusting bolts 32a, b, c, and d an operator can raise and lower the frame 16 relative to the conveyor 12 as well as level the longitudinal members 28a and b along their lengths.

Figure 3:
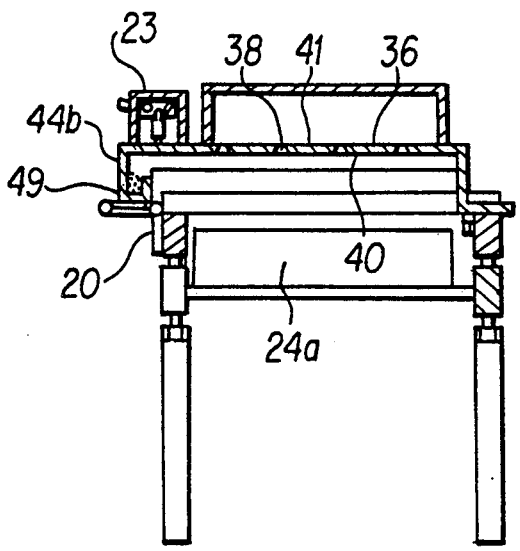
FIG. 3 is a partially cross-sectional view taken on line 2—2 in FIG. 1 with a seeder plate thereof being in a planting position and a plug tray being at a planting position.

The seeder plate 18 comprises a seeder tray 34 which defines a seeder sheet 36 having counter-sunk seed holes 38 therethrough. In this regard, the counter-sunk seed holes 38 are larger on a front side 40 which can be seen in FIG. 1, than on a backside 41, opposite to the front side 40. As can be seen in FIG. 1, the seed holes 38 are positioned in a particular pattern, or grid. The seeder tray 34 also defines side walls 42a and b and end walls 44a and b which enclose the front side 40 of the seeder sheet so as to prevent seeds positioned on the front side 40 from escaping laterally, parallel to the front side 40 from the front side 40. A pressure plenum 48 includes a hand grip 46 thereon which can be use for manipulating the seeder plate 18. The inner, or hinge-edge, end wall 44b forms an inverted U-trough shaped sump 49 for catching seeds when the seeder plate 18 is moved from a loading position, as shown in FIG. 1, to a planting position as shown in FIG. 3, as will be further described below.

The seeder plate 18 includes the pressure plenum 48 mounted on the backside 41 of the seeder sheet 36 so as to cover all of the seed holes 38. The interior of the pressure plenum 48 communicates with the compressor 21 via a tube 50 which selectively applies negative and positive pressures to the front side 40 of the seeder sheet 36 through the seed holes 38.

Figure 4:
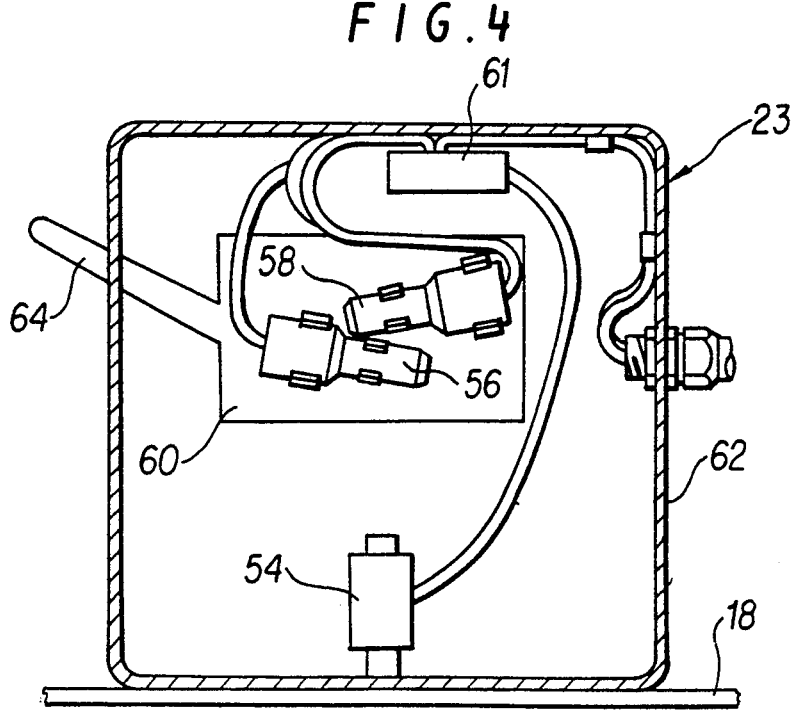
FIG. 4 is a partially cross-sectional view of a mercury-switch-and-tapper vibration apparatus of this invention.

The seeder plate 18 further includes a vibration, or tapper, apparatus 23, also mounted on the backside of the seeder sheet 36 near a hinged edge thereof adjacent the inner, or hinge-edge, end wall 44b. A rough example of the vibration apparatus is shown in more detail in FIG. 4 with the seeder plate 18 in the planting position of FIG. 3. The vibration apparatus 23 includes an electronically activated vibrator, or tapper, 54 which is activated by mercury switches 56 and 58 via appropriate couplings 61. In this regard, the mercury switches 56 and 58 are mounted on a rotatable member 60 which can be adjusted externally of a housing 62 by means of a lever 64.

Controlling apparatus for the seeder apparatus 10 comprise a momentary, or pressure-reversing, switch 66 which is coupled to a sucking/blowing solenoid, which is part of the compressor apparatus 21, and to the power conveyor-drive 14 via a delay device 68. In this regard, when the seeder plate 18 is in the planting position, as depicted in FIG. 3, a portion thereof impinges on the pressure-reversing switch 66, thereby sending a signal to the sucking/blowing solenoid of the compressor apparatus 21 to cause a positive pressure in the tube 50 and in the pressure plenum 48. Conversely, when the seeder plate 18 is moved away from the pressure-reversing switch 66 the sucking/blowing solenoid is operated to steer the compressor to cause negative pressure in the tube 50 and in the pressure plenum 48, thereby sucking seeds to the seed holes 38. Simultaneously therewith, when the seeder plate 18 impinges on the pressure-reversing switch 66 a signal is sent to the power conveyor-drive 14 thereby triggering it to transport the plug tray 24a, lying immediately under the planting position of the seeder plate 18, in the direction of the arrow 26 and to transport a new plug tray 24b to the planter position. However, because of the delay 68, the power conveyor-drive 14 does not immediately transport the plug trays 24 upon the seeder plate 18 reaching the planting position, but rather waits until the pressure in the pressure plenum 48 has been reversed from negative to positive and seeds held at the seed holes 36 have been deposited in the plug tray 24a.

The hinges 20 are off-the-shelf, three-piece or -plate, barroom-door type, double-acting, spring-biased, hinges. That is, they bias the seeder plate toward the neutral position of FIG. 2.

Describing now operation of the seeder apparatus 10, an operator stands beside the plug-tray conveyor 12 and hand-operates the seeder plate 18. That is, the operator grips the seeder plate 18 by the hand grip 46 and rotates it 180° about the double-acting, spring-loaded, barroom-door hinges between the loading position shown in FIG. 1 and the planting position shown in FIG. 3. In this regard, when the operator moves the seeder plate 18 to the loading position of FIG. 1, round seed pellets which have been temporarily stored in the sump 49 spread across the front side 40 of the seeder sheet 36 and the operator manipulates the seeder plate 18 into and out of the horizontal to thereby cause these seed pellets to roll into the seed holes 38 to which a negative pressure is being applied from the pressure plenum 48. Thus, once a seed pellet finds a seed hole it is held there by this negative pressure. In this regard, the seed pellets are larger in size than the holes and will not actually pass through the holes but rather will be held thereat.

It is important that, prior to beginning operation, the leveling/height-adjusting bolts 32a–d be manipulated to make the hinge edge 70 of the seeder plate 18 horizontal so that when the seeder plate 18 is rotated at the hinges 20 during operation it can easily be made horizontal in the loading position.

Figure 2:
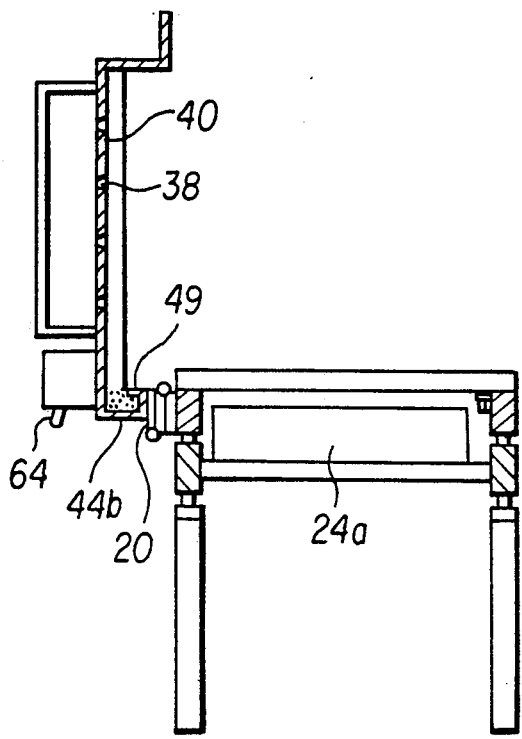
FIG. 2 is a partially cross-sectional view taken on line 2—2 in FIG. 1 with the seeder plate thereof being in an intermediate, neutral, position and a plug tray being at a planting position.

Once the operator sees that substantially all of the seed holes 38 in the seeder sheet 36 have seed pellets held therein, he or she rotates the seeder plate about the double-acting, spring-loaded, barroom-door hinges 20 thereby causing the seeder plate 18 to rotate 180° through the neutral position shown in FIG. 2 to the planting position shown in FIG. 3. In the planting position of FIG. 3, the seeder sheet 36 is again in a horizontal position, but this time, its front side 40 is facing downwards. As the seeder plate 18 is rotated upwards between the loading position of FIG. 1 and the neutral position of FIG. 2, seed pellets which are not held in seed holes 38 by a negative pressure roll across the seeder sheet 36 toward the hinge edge 70 of the seeder plate 18 and strike the end wall 44b. As the seeder plate 18 is rotated further, between the FIG. 2 and FIG. 3 positions, the seed roll along the end wall 44b to enter into the sump 49. Thus, as is shown in FIG. 3, when the seeder plate 18 is in the planting position, excess seed pellets are stored in the sump 49. Also, while the seeder plate 18 is being moved from the loading position of FIG. 1 to the neutral position of FIG. 2, the mercury switches 56 and 58 cooperate to activate, during an angle interval, the vibrator, or tapper, 54 which vibrates the seeder sheet 36, thereby further encouraging seed pellets not held at seed holes 38 by a negative pressure to roll along the front side 40 of the seeder sheet 36 toward the end wall 44b. The angle interval, or "window", of vibrations is determined by the angular position of the lever 64 and the rotatable member 60 on which the mercury switches 56 and 58 are mounted.

Once the seeder plate has been moved to the planting position, as shown in FIG. 3, the pressure-reversing switch 66 is activated by impingement of the seeder plate 18 thereon, thereby causing a reversal of pressure at the seed holes 38, as has been previously described, and a releasing of seeds into containers in the plug tray 24a which is positioned immediately below the loading position of the seeder plate 18 shown in FIG. 3. Also, activation of the pressure-reversing switch 66, after a delay due to the delay device 68, causes the plug tray 24a to move away from the planting position and a new plug tray 24b to be moved to the planting position. In this regard, once the pressure-reversing switch 66 activates the power conveyor-drive 14, other sensors (not shown) stop the conveyor drive 14 once the new plug tray 24b is at the planting position.

It is important that there are basically three relatively stable positions of the seeder plate, the loading position as shown in FIG. 1, the planting position as shown in FIG. 3, and the neutral position as shown in FIG. 2. In this regard the double-acting, spring-loaded, bar-room door hinges 20 are spring biased toward the neutral position of FIG. 2. That is, spring biasing within these hinges aids an operator in moving the seeder plate 18 from the loading position of FIG. 1 to the neutral position of FIG. 2 and from the planting position of FIG. 3 to the neutral position of FIG. 2. Similarly, these hinges counteract gravity when the seeder plate is at either the loading position of FIG. 1 or the planting position of FIG. 3, thereby making the seeder plate 18 effectively "lighter" for the operator. Thus, when the seeder plate 18 is in the loading position of FIG. 1, it effectively "floats" so that an operator can easily manipulate it in such a manner as to cause seeds to properly spread across the front side 40 of the seeder sheet 36.

Therefore, it is highly advantageous to use spring-loaded hinges which are biased toward a neutral position lying intermediate extreme loading and planting positions in a hand-operated seeder.

It is also highly beneficial to have the frame of this invention mounted on the plug-tray conveyor 12 by means of a mechanism which allows an operator to level the frame 16 and to adjust its height. With regard to leveling the frame 16, this is important in this invention, because when the seeder plate 18 is rotated to the loading position about the hinges 20 an operator must be able to move the front side 40 of the seeder sheet 36 through a horizontal position so that seed pellets distribute uniformly across the front side. Thus, if one hinge 20 were higher than the other hinge 20, the front side 40 of the seeder sheet 36 could not be horizontal and all the seed pellets on the front side 40 would roll to one side wall 42a or b.

Similarly, adjustment of the height of the frame is important so that the front side 40 of the seeder sheet 36 can be placed as close as possible to top surfaces of plugs in a plug-tray 24 when the seeder plate 18 is in the planting position. That i,, some plug-trays are much taller than other plug-trays and, therefore, it is desirable to be able to move the seeder plate upwards and downwards to place the seeder sheet as closely as possible to tops of the plug-trays. If the seeder sheet were too far from a plug-tray, the seed pellets may not be properly positioned upon their release.

It is also important to this invention, that a vibrator, or tapper, be provided to vibrate the seeder sheet while the seeder plate is rotated between the loading position and the neutral position, and that the angle of vibration can be easily adjusted, because this positively separates loose seed pellets from pressure-held seed pellets and encourages the loose seed pellets to flow, or roll, toward the hinged end wall 44b and allows optimal adjustment thereof.

Yet another significant feature of this invention is the delay device which delays movement of plug-trays once the seeder plate has been placed in the planting position until pressure in the seeder plate has been reversed, thereby depositing seed pellets held in seed holes of the seeder sheets.

While the invention has been particularly shown and described with reference to a preferred embodiment it will be understood by those skilled in the art that various changes in form and detail may be made therein without departing from the spirit and scope of the invention. For example, in one embodiment the seeder tray is shaped quite differently than that shown in the drawings such that when the seeder plate 18 is moved to the planting position of FIG. 3 the seeder tray 34 is positioned closer to the plug-trays. For example, in one embodiment, the end wall 44a is the same height and shape as the side walls 42a and b and the pressure-reversing switch 66 extends upwards, above the frame 16 to contact the seeder sheet 36 when the seeder plate 18 is in the planting position of FIG. 3, rather than as is shown in the drawings.

Further, this invention can be used with many different types of conveyors and frames and the components thereof can be shaped and arranged quite differently than those depicted in the drawings filed herewith.

The embodiments of the invention in which an exclusive property or privilege are claimed or defined as follows:

1. A seeder apparatus of a type for holding and releasing seeds in a pattern, said seeder comprising:
   a seeder plate defining a substantially-flat seeder sheet having seed holes therein arranged in said pattern, said seeder plate including a pressure means for selectively producing negative or not-negative pressures on a backside of said seeder sheet which are communicated through said seed holes to a front side of said seeder sheet;
   a frame means for supporting the seeder plate of said seeder apparatus adjacent to a plating position at which said seeds are to be released;
   hinge means at a hinge edge of said seeder plate for coupling said hinge edge of said seeder plate to said frame means and for allowing said seeder plate to be rotated through an angle of substantially 180° relative to said frame means between a loading position in which said seeder sheet is approximately horizontal with the backside facing downwards and the planting position in which the front side of said seeder sheet faces downwards, said hinge means being spring-biased toward a position intermediate of said loading and planting positions;
   said pressure means including a control means for causing a negative pressure when said seeder plate is in said loading position and a not-negative pressure when said seeder plate is in said planting position.

2. A seeder apparatus as in claim 1 wherein said seeder plate includes an excess-seed-catching means for catching seeds form the seeder sheet when said seeder plate is moved from the loading position to the planting position and for redistributing said seeds on said seeder plate when said seeder plate is moved from the planting position to the loading position.

3. A seeder apparatus as in claim 1 wherein said seeder apparatus further includes a plug-tray conveyor and a mounting means for mounting said frame means on said plug-tray conveyor, said mounting means including a leveling-adjustment mechanism which allows adjustment of the position of the frame relative to the plug-tray conveyor so that the frame can be levelled.

4. A seeder apparatus as in claim 3 wherein is further included a vibrator for vibrating said seeder sheet when it is moved from the loading position toward the planting position thereby causing seeds to move more easily along the front side of the seeder sheet.

5. A seeder apparatus as in claim 4 wherein said seeder apparatus includes an activation means for activating said vibrator in response to the angular position of the seeder plate.

6. A seeder apparatus as in claim 1 wherein is further included a vibrator for vibrating said seeder sheet when it is moved form the loading position toward the planting position thereby causing seeds to move more easily along the front side of the seeder sheet.

7. A seeder apparatus as in claim 6 wherein said seeder apparatus includes an activation means for activating said vibrator in response to the angular position of the seeder plate.

8. A seeder apparatus as in claim 7 wherein is further included an adjustment means for adjusting the angles at which the angular-position activation of the vibrator is caused.

9. A seeder apparatus as in claim 1 wherein said seeder apparatus further comprises a plug-tray conveyor and wherein is further included a control means for controlling activation of the conveyor responsive to rotational movement of the seeder plate about the hinge means.

10. A seeder apparatus as in claim 9 wherein said control apparatus includes means for activating the conveyor upon movement of the seeder plate to the planting position after a delay.

11. A seeder apparatus as in claim 1 wherein said hinge means includes a three-plate, double-acting, spring, barroom-door-type, hinge.

12. A method of planting seeds in a predetermined pattern by use of a pressurized seeder apparatus comprising the steps of:
   attaching a hinge edge of a seeder plate to a frame by means of hinges which allow substantially 180° of movement of the seeder plate, said seeder plate defining a substantially-flat seeder sheet having seed holes therein arranged in said pattern, said seeder plate including a pressure means for selectively producing negative or not-negative pressures on a backside of said seeder sheet which is communicated through said seed holes to a front side of the seeder sheet;
   arranging the frame such that when said seeder plate is rotated through said substantially 180° rotation relative to said frame, it is moved between a loading position in which said seeder sheet is approximately horizontal with the backside thereof facing downwards and planting position in which the front side of the seeder sheet faces downwards;
   applying a negative pressure to the backside of said seeder sheet when said seeder plate is in said loading position and a not-negative pressure to the backside of the seeder sheet when said seeder plate is in the planting position;
   disbursing seed pellets on the front side of said seeder sheet when said seeder sheet is in the loading position and gathering loose seed pellets from the front side of said seeder sheet when said seeder plate is moved from said loading position to said planting position; and
   spring biasing said seeder plate toward a position intermediate of said 180° of movement.

13. The method of claim 12 wherein the hinges used to attach the seeder plate to said frame are spring-biased toward a position intermediate of said loading position and said planting position.

14. The method of claim 13 wherein the hinges used are three-plate, double-acting, spring, barroom-door-type, hinges.

15. A seeder apparatus of a type for holding and releasing seeds in a pattern, said seeder comprising:
   a seeder plate defining a substantially-flat seeder sheet having seed holes therein arranged in said pattern, said seeder plate including a pressure means for selectively producing negative or not-negative pressures on a backside of said seeder sheet which are communicated through said seed holes to a front side of said seeder sheet;
   a frame means for supporting the seeder plate of said seeder apparatus adjacent to a planting position at which said seeds are to be released;
   hinge means at a hinge edge of said seeder plate for coupling said hinge edge of said seeder plate to said frame means and for allowing said seeder plate to be rotated through an angle substantially 180° relative to said frame means between a loading position in which said seeder sheet is approximately horizontal with the backside facing downwards and the planting position in which the front side of said seeder sheet faces downwards;
   a vibrator coupled to said seeder sheet for vibrating said seeder sheet when it is moved form the loading position toward the planting position thereby causing seeds to move more easily along the front side of the seeder sheet;
   said pressure means including a control means for causing a negative pressure when said seeder plate is in said loading position and a not-negative pressure when said seeder plate is in said planting position.

16. A seeder apparatus as in claim 15 wherein said seed apparatus includes an activation means for activating said vibrator responsive to the angular position of the seeder plate.

17. A seeder apparatus as in claim 16 wherein is further included an adjustment means for adjusting the angular positions of the seeder plate at which activation of the vibrator is caused by said activation means.

* * * * *